United States Patent Office 2,760,956
Patented Aug. 28, 1956

2,760,956

PRODUCTION OF S-ACETYL GLUTATHIONE

Eric Charles Brick, Prenton, Birkenhead, England, assignor to The Distillers Company Limited, Edinburgh, Scotland, a British company No Drawing. Application February 25, 1955,
Serial No. 490,687

Claims priority, application Great Britain March 31, 1954

11 Claims. (Cl. 260—112)

The present invention relates to an improved method for the production of S-acetyl glutathione.

S-acetyl glutathione is known in the art, and is an important tool in biochemical studies of trans-acetylation and energy transfer in cell metabolism. Since it is closely related to glutathione, which is a basic cell component effective in many body functions, it is of value in clinical studies of detoxification, diabetes, radiation exposure and other disease states in which the sulphydryl system is involved.

The compound has previously been prepared by the treatment of glutathione with phenyl-thioacetate (Agnew Chem. 1952, 64, 59) and with thioacetic acid (J. Biol. Chem. 1954, 206, 327). These reagents are, however, expensive and difficult to prepare.

According to the present invention the process for the production of S-acetyl glutathione comprises treating glutathione with acetic anhydride in acetic acid solution, in the presence of perchloric acid.

The glutathione is suitably dissolved in a mixture of glacial acetic acid and perchloric acid, warming if necessary to effect solution, before the addition of the acetic anhydride.

The acetic anhydride is desirably present in molar excess with respect to the glutathione present in the final reaction mixture to ensure a high yield of S-acetyl glutathione. A suitable excess has been found to be a molar excess of about 40%.

When acetylation of the sulphydryl groups has substantially ceased, the excess acetic anhydride can be decomposed if desired, for example by the addition of a suitable amount of water, thus reducing the effect of any unwanted side reactions which may take place after the desired reaction is substantially complete.

The perchloric acid is suitably used in the form of a strong aqueous solution of not less than about 70% weight for weight of perchloric acid, for example 72% weight for weight aqueous perchloric acid. The amount of perchloric acid used should be adequate to make the reaction mixture strongly acid, for example, about 0.5 to 1.0 molar concentrations of the acid with respect to the mixture have been found suitable.

The reaction of the acetylation of the sulphydryl group is desirably carried out at room temperature or below, that is below about 25° C., with cooling as required.

When the acetylating reaction has substantially ceased and, if desired, the excess acetic anhydride has been decomposed, the reaction mixture may be neutralised by the addition of a suitable base, for example aniline, which is preferably added slowly and with cooling. An excess of the base with respect to the perchloric acid may be added, for example when using aniline about 30% excess over that required theoretically to neutralise the perchloric acid present has been found to be suitable.

The term neutralise as used herein is not intended to mean that the pH of the mixture is adjusted to pH 7 by the addition of the base since the presence of acetic acid renders this difficult. By the term neutralise is meant the addition of a suitable base in a quantity at least equal to the theoretical quantity required to react with all the perchloric acid present.

The S-acetyl glutathione may then be separated by known methods, such as, for example, transferring the crude solution of S-acetyl glutathione to a liquid from which it will crystallise on standing, for instance methanol, and collecting the crystals formed, and further purifying these as desired, for example by washing and recrystallising.

The following examples are given to illustrate the process of the present invention:

Example 1

Three grams of glutathione were dissolved in a mixture of 1 ml. of 72% weight for weight aqueous perchloric acid and 19 mls. of glacial acetic acid with warming as necessary. The solution was then maintained below 15° C. whilst 5 mls. of acetic anhydride were slowly added with shaking, a quantity sufficient to provide about 40% molar excess of acetylating agent. After standing 1 hour at room temperature to complete acetylation, 0.4 ml. of water was added and the mixture stood for a further hour to remove excess acetic anhydride. It was then treated with 1.5 mls. freshly distilled aniline, slowly with cooling, to neutralise the perchloric acid. The mixture was then poured into methanol to give a volume of 100 mls., stirred, and left standing in a refrigerator over-night to effect crystallisation. The crude crystals were separated and washed with methanol and ether, before drying in air at 50–60° C. for 1 hour to give 2.4 gms. of material, representing a 70% yield on glutathione. Further addition of methanol and/or ether to the mother liquor gave only a very small amount of product.

Example 2

Fifty grams of 97.7% weight for weight pure glutathione were dissolved in a mixture of 16.7 mls. of 72% weight for weight aqueous perchloric acid and 315 mls. of glacial acetic acid, with warming as necessary. The solution was maintained below 15° C. whilst 83.3 mls. of acetic anhydride were slowly added with shaking and acetylation then allowed to proceed for 1 hour at room temperature. Excess acetic anhydride was then removed by adding 6.7 mls. of water and again standing for 1 hour. The solution was then treated with 25 mls. of aniline, added slowly with cooling, and poured into 1200 mls. of methanol, stirred and left standing overnight in a refrigerator. The crude crystals were separated, and washed with methanol and ether, before drying in air at 50–60° C. for 1 hour, to give 42 gms. of material, representing a 70% yield on glutathione.

I claim:

1. A process for the production of S-acetyl glutathione which comprises acetylating glutathione with acetic anhydride in acetic acid solution in the presence of perchloric acid and recovering the S-acetyl glutathione thus formed.

2. A process as claimed in claim 1 wherein the glutathione is dissolved in a mixture of glacial acetic acid and perchloric acid before adding the acetic anhydride.

3. A process as claimed in claim 1 wherein the acetic anhydride is present in molar excess with respect to the glutathione present.

4. A process as claimed in claim 3 wherein the molar excess of acetic anhydride is about 40%.

5. A process as in claim 3 wherein any excess acetic anhydride, after acetylation of the sulphydryl groups of the glutathione has substantially ceased, is decomposed by the addition of water.

6. A process as claimed in claim 1 wherein the concentration of perchloric acid in the reaction mixture is in the range of about 0.5 to 1.0 molar with respect to the mixture.

7. A process as claimed in claim 1 wherein the perchloric acid is added in the form of a strong aqueous solution of not less than about 70% weight for weight perchloric acid.

8. A process as claimed in claim 1 wherein the reaction is carried out below about 25° C.

9. A process as claimed in claim 5 wherein the reaction mixture is neutralised before the separation of the S-acetyl glutathione.

10. A process as claimed in claim 9 wherein the neutralising agent used is aniline.

11. A process as claimed in claim 10 wherein the aniline is added to give an excess of about 30% with respect to that required to neutralise all the perchloric acid present.

References Cited in the file of this patent

Whitman et al.: JACS 68, 1865–6 (1946).
Wieland et al.: Agnew Chem. 64, 59 (1952).
Anson et al.: Advances in Protein Chem. III, 191 (1947).